US009903021B2

(12) United States Patent
Gebregiorgis et al.

(10) Patent No.: US 9,903,021 B2
(45) Date of Patent: Feb. 27, 2018

(54) METHOD FOR USING 3-COAT-1-BAKE WATERBORNE COATING COMPOSITION

(75) Inventors: Taddesse Gebregiorgis, Rochester, MI (US); Donald Albert Paquet, Jr., Troy, MI (US)

(73) Assignee: AXALTA COATINGS SYSTEMS IP CO., LLC, Wilmington, DE (US)

( * ) Notice: Subject to any disclaimer, the term of this patent is extended or adjusted under 35 U.S.C. 154(b) by 690 days.

(21) Appl. No.: 13/141,865

(22) PCT Filed: Dec. 29, 2009

(86) PCT No.: PCT/US2009/069724
§ 371 (c)(1),
(2), (4) Date: Jun. 23, 2011

(87) PCT Pub. No.: WO2010/078355
PCT Pub. Date: Jul. 8, 2010

(65) Prior Publication Data
US 2011/0256320 A1    Oct. 20, 2011

Related U.S. Application Data

(60) Provisional application No. 61/141,051, filed on Dec. 29, 2008.

(51) Int. Cl.
| | | |
|---|---|---|
| *C23C 26/00* | (2006.01) | |
| *B05D 7/14* | (2006.01) | |
| *B05D 7/00* | (2006.01) | |
| *C09D 175/00* | (2006.01) | |

(52) U.S. Cl.
CPC ........... *C23C 26/00* (2013.01); *B05D 7/14* (2013.01); *B05D 7/572* (2013.01); *C09D 175/00* (2013.01); *B05D 7/574* (2013.01); *B05D 2202/10* (2013.01); *B05D 2451/00* (2013.01)

(58) Field of Classification Search
CPC .......... B05D 7/50; B05D 7/574; B05D 7/572; B05D 7/56; B05D 7/57; C08G 18/0823; C08F 220/02; C08F 220/06
See application file for complete search history.

(56) References Cited

U.S. PATENT DOCUMENTS

| | | | |
|---|---|---|---|
| 4,389,502 A | | 6/1983 | Fry et al. |
| 5,227,422 A | * | 7/1993 | Mitsuji ............. C08G 18/0823 524/457 |
| 5,314,945 A | * | 5/1994 | Nickle ............... C09D 133/066 524/507 |
| 5,322,715 A | * | 6/1994 | Jouck et al. .................. 427/409 |
| 5,614,590 A | * | 3/1997 | Bederke ............ C08G 18/6229 427/384 |
| 5,658,617 A | | 8/1997 | Göbel et al. |
| 6,210,758 B1 | * | 4/2001 | McNeil .................... B05D 7/57 427/409 |
| 6,436,540 B1 | | 8/2002 | Garcia et al. |
| 2002/0156145 A1 | * | 10/2002 | Van Den Berg et al. ...... 522/84 |
| 2003/0017274 A1 | * | 1/2003 | Luettenberg ........... B05D 7/572 427/407.1 |
| 2003/0224195 A1 | * | 12/2003 | Tysak ............................ 428/515 |
| 2004/0147684 A1 | * | 7/2004 | Masuda et al. ................ 525/309 |
| 2005/0238899 A1 | * | 10/2005 | Nagata ................. C08G 18/289 428/480 |
| 2005/0255330 A1 | * | 11/2005 | Meyer ........................... 428/480 |
| 2006/0257671 A1 | * | 11/2006 | Yahkind ........................ 428/447 |
| 2007/0010612 A1 | * | 1/2007 | Rouge ................ C08G 18/0823 524/501 |
| 2007/0014863 A1 | | 1/2007 | Yamaguchi et al. |
| 2007/0259123 A1 | * | 11/2007 | Nagano et al. ............ 427/407.1 |
| 2008/0131714 A1 | | 6/2008 | Toi et al. |

FOREIGN PATENT DOCUMENTS

| | | |
|---|---|---|
| EP | 0468293 | 1/1992 |
| EP | 0575859 | 12/1993 |
| EP | 0744412 | 11/1996 |
| EP | 2080776 | 7/2009 |
| WO | 2005116109 A1 | 12/2005 |

OTHER PUBLICATIONS

ISA Korean Intellectual Patent Office, International Search Report and Written Opinion for Application No. PCT/US2009/069724, dated Aug. 2, 2010.
ISA Korean Intellectual Patent Office, International Preliminary Report on Patentability for Application No. PCT/US2009/069724, dated Jul. 7, 2011.
European Patent Office, European Extended Search Report for Application No. 09837126.3, dated Jan. 8, 2014.
European Patent Office, European Examination Report issued in Application No. 09 837 126.3, dated Nov. 4, 2015.

* cited by examiner

*Primary Examiner* — Francisco W Tschen
(74) *Attorney, Agent, or Firm* — Lorenz & Kopf LLP

(57) ABSTRACT

Disclosed herein is a method to apply waterborne primer, basecoat and clearcoat compositions in a wet-on-wet manner followed by the curing of all three applied compositions to form a durable protective coating on a substrate. The primer composition comprises (meth)acrylic latex, polyurethane resin, melamine and, optionally, polyesters.

3 Claims, No Drawings

METHOD FOR USING 3-COAT-1-BAKE WATERBORNE COATING COMPOSITION

PRIORITY

This application is a U.S. National-Stage entry under 35 U.S.C. § 371 based on International Application No. PCT/US2009/069724, filed Dec. 29, 2009 which was published under PCT Article 21(2) and which claims priority from Provisional U.S. Patent Application Ser. No. 61/141,051, filed Dec. 29, 2008, incorporated herein by reference.

FIELD OF THE DISCLOSURE

This disclosure is related to a coating system that comprises waterborne primer, waterborne basecoat and waterborne clearcoat compositions. The three coating compositions are capable of being applied in a wet-on-wet-on-wet manner and being cured with a single baking step. A flash drying step between the application of each waterborne coating composition is optional, but preferred.

BACKGROUND OF THE DISCLOSURE

An automotive substrate typically has several layers of paint applied during manufacture. The first coating is generally an electrodeposited primer composition that helps the underlying metal substrate resist corrosion. The electrodeposited layer is baked after application to dry and cure the applied layer. The second layer is a primer composition that helps to form a smooth surface for the subsequent paint applications and can also help to resist chipping damage. The primer layer is applied and then baked to dry and cure the layer. The primed substrate then has one or more layers of a basecoat composition applied to give the substrate its final color position. The basecoat composition is generally flash dried, but not cured, to remove a portion of the solvent prior to application of a clearcoat composition. One or more layers of a clearcoat composition is applied, and then the combined basecoat layer(s) and clearcoat compositions are then cured to form a durable aesthetically pleasing finish.

The above described method is generally called a wet-on-wet process, as the clearcoat is applied over the "wet" layer(s) of basecoat.

The phrase "wet-on-wet" means that a layer of a coating composition has not been cured prior to the application of the next layer of coating composition, although some of the solvent may have been removed in a flash-dry step.

Automobile manufacturers typically apply the various layers of coating composition in this manner to obtain the highest levels of appearance and durability for a vehicle finish. However, it is desired to remove at least a portion of the high energy baking steps from the painting process. In order to remove at least a portion of the baking steps, the various layers of coating compositions must be formulated in such a way so as to resist intermixing (sometimes called holdout) with a subsequently applied layer. Intermixing of the applied layers of coating compositions can cause a decrease in the durability and appearance values of the finish.

It is desired to remove the baking step used to cure the primer composition. Removing the primer bake step results in a process that is typically called a wet-on-wet-on-wet or 3-wet process. In this process, one or more layers of a primer composition is applied to the baked electrocoat composition followed by one or more layers of the basecoat composition followed by one or more layers of a clearcoat composition. Optionally, any or all of the applied layers may be flash-dried to remove at least a portion of the solvent. Finally, the primer, basecoat and clearcoat compositions are baked to cure each layer.

The following disclosure provides for waterborne primer, basecoat and clearcoat compositions that can be applied one after another without a baking step in between the application steps.

SUMMARY OF THE DISCLOSURE

The present disclosure relates to a method for using a 3-coat-1-bake waterborne coating composition to form a multilayer coated substrate. The method of forming a multilayer coating on a substrate comprises the steps of;
(1) applying to the substrate a layer of a waterborne primer composition;
(2) applying a layer of a waterborne basecoating composition;
(3) applying a layer of a waterborne clearcoat composition; and
(4) curing the applied three layers by baking;
wherein said waterborne primer composition comprises;
  (a) a waterborne or water dispersible film forming binder; and
  (b) pigments;
wherein said (a) waterborne or water dispersible film forming binder comprises;
  (A) 20 percent to 60 percent by weight (meth)acrylic latex;
  (B) 5 percent to 40 percent by weight of a polyurethane resin;
  (C) 5 percent to 30 percent by weight melamine; and
  (D) optionally, up to 25 percent by weight of polyester;
and wherein the pigment to film forming binder ratio of said waterborne primer composition is in the range of from 80/100 to 150/100.

DETAILED DESCRIPTION

As used herein, the term (meth)acrylic is used to describe both acrylic and methacrylic.

As used herein, the term (meth)acrylate is used to describe both acrylate and methacrylate.

In this disclosure, the term "binder" or "film forming binder" refers to the film-forming polymers, the crosslinking agent, and all other optional film-forming components, as are further described. The film forming binder includes all the components that contribute to the final crosslinked network of the coating composition. Generally, catalysts, pigments, and non-polymeric chemical additives such as stabilizers described hereinafter are not considered part of the film forming binder. Non-film forming binder components other than pigments usually do not amount to more than about 5-15% by weight of the composition.

The term "total solids" or "solids content" refers to the total amount of non-volatile material in the coating composition.

By "flash-dry" is meant that at least a portion of the solvent is removed from an applied layer of coating composition, but it is not intended that curing of the layers occurs during the flash-dry step.

By "dry and cure" is meant that greater than 90% of the solvent has been removed and that the film-forming binder has begun to form a crosslinked network. While it is intended for a majority of the crosslinks to form during the drying and curing step, the curing stage may not be complete and additional crosslinks can form over time.

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this disclosure, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

The present disclosure describes a method for applying waterborne primer, basecoat and clearcoat compositions in a wet-on-wet-on-wet manner over a previously electrocoated and cured substrate. The method of forming a multi-layer coating on a substrate comprises the steps of;
(1) applying to the substrate a layer of a waterborne primer composition;
(2) applying a layer of a waterborne basecoating composition;
(3) applying a layer of a waterborne clearcoat composition; and
(4) curing the applied three layers by baking.

Optionally, each of the applied primer, basecoat and clearcoat layers can be flash-dried to remove at least a portion of the solvent prior to the subsequent application of the next layer of coating composition or any combination of applied layers can be flash-dried to remove at least a portion of the solvent.

The coating compositions that are described herein can be the only coatings applied to the substrate or, other coating compositions can be applied prior to or after application of the described coatings. For example, in the case of an automobile substrate, several rust-preventative treatments may be applied, including, for example, phosphate coatings and/or electrodeposition coatings, prior to the application of the waterborne coating compositions described herein.

The waterborne primer composition comprises or consists essentially of (a) waterborne or water dispersible film forming binder and (b) pigments and has solids content in the range of from 40 to 60 percent by weight.

In one embodiment, the film forming binder of the waterborne primer composition comprises or consists essentially of;
(A) in the range of 20 to 60 by weight of (meth)acrylic latex;
(B) in the range of from 5 to 40 by weight of a polyurethane resin; and
(C) in the range of from 5 to 20 percent by weight of a melamine; and
(D) optionally, up to 25 percent by weight of a polyester resin.

In another embodiment, the waterborne or water dispersible film forming binder of the waterborne primer composition comprises or consists essentially of;
(A) in the range of from 25 to 55 percent by weight of (meth)acrylic latex;
(B) in the range of from 20 to 35 percent by weight of a polyurethane resin; and
(C) in the range of from 7 to 15 percent by weight of a melamine; and;
(D) in the range of from 0.1 to 20 percent by weight of polyester resin.

In a third embodiment, the waterborne or water dispersible film forming binder of the waterborne primer composition comprises or consists essentially of;
(A) in the range of 30 to 50 percent by weight of (meth)acrylic latex;
(B) in the range of from 25 to 30 percent by weight of a polyurethane resin; and
(C) in the range of from 8 to 14 percent by weight of a melamine; and;
(D) in the range of from 10 to 18 percent by weight of polyester resin.

All percents by weight are based upon the sum of (A), (B), (C) and (D), if present, being equal to 100 percent.

The waterborne primer composition also comprises pigments. In one embodiment, the pigment to film forming binder (P/B) ratio is in the range of from 80/100 to 150/100 and in a second embodiment, the P/B ratio is in the range of from 80/100 to 100/100. It has been found that the P/B ratio can be critical to the quality and appearance of the applied coating compositions. A waterborne primer composition having a P/B ratio of less than 80 can exhibit a defect known as mud-cracking. This defect is recognizable as visible cracking in films of paint caused by shrinkage tension during drying. The disclosed waterborne primer compositions having a P/B ratio of 80/100 or greater did not exhibit mud-cracking.

Any of the pigments typically used for primer compositions can be used. Suitable pigments include, for example, titanium dioxide, zinc phosphate, iron oxide, carbon black, amorphous silica, high surface area silica, barium sulfate, talc; chromate pigments for corrosion resistance, such as, calcium chromate, strontium chromate, zinc chromate, magnesium chromate, barium chromate; hollow glass spheres or a combination thereof. The pigments are typically added to the waterborne primer compositions as dispersions of pigments in a solvent such as water as is known in the art.

(Meth)acrylic Latex

The (meth)acrylic latex (A), has a weight average molecular weight, Mw, in the range of from 500,000 to 3,000,000 and is preferably made by the emulsion polymerization of a monomer mixture.

In one embodiment, the (meth)acrylic latex (A), is a copolymer produced by the polymerization of a monomer mixture comprising or consisting essentially of:
(a1) from 20 to 75 percent by weight of ester modified (meth)acrylic monomer;
(a2) from 10 to 55 percent by weight of alkyl (meth)acrylate monomer; and
(a3) from 5 to 30 percent by weight of styrene monomer.

In a second embodiment, the (meth)acrylic latex (A), is a copolymer produced by the polymerization of a monomer mixture comprising or consisting essentially of:
(a1) from 25 to 65 percent by weight of ester modified (meth)acrylic monomer;

(a2) from 25 to 50 percent by weight of alkyl (meth) acrylate monomer; and (a3) from 10 to 25 percent by weight of styrene monomer.

In a third embodiment, the (meth)acrylic latex (A), is a copolymer produced by the polymerization of a monomer mixture comprising or consisting essentially of:

(a1) from 35 to 55 percent by weight of ester modified (meth)acrylic monomer;

(a2) from 30 to 40 percent by weight of alkyl (meth) acrylate monomer; and (a3) from 12 to 20 percent by weight of styrene monomer.

All percents by weight are based upon the sum of (a1), (a2) and (a3) being equal to 100 percent.

Some examples of suitable ester modified (meth)acrylic monomers (a1), are commercially available, for example, TONE® M-100 caprolactone modified (meth)acrylic monomer, available from Dow Chemical Company, Midland, Mich. Other ester modified (meth)acrylic monomers are available to one of ordinary skill in the art. Procedures for producing these monomers are known. In one embodiment, a suitable lactone or hydroxy acid may be reacted with hydroxy or epoxy functional (meth)acrylic monomers to form an ester modified (meth)acrylic monomer which has the general formula;

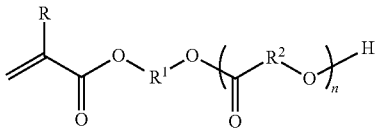

wherein R is H or $CH_3$, $R^1$ is an alkyl or hydroxyalkyl group of 2 to 10 carbon atoms, $R^2$ is an alkyl group of 2 to 12 carbon atoms and n is 1 to 100. In one embodiment, the ester modified (meth)acrylic monomer is TONE® M-100 available from Dow Chemical, Midland, Mich.

In an alternative procedure, the (meth)acrylic latex can be polymerized with hydroxy or epoxy functional (meth)acrylate monomers and the resulting polymer can be post-reacted with a suitable lactone or hydroxy acid to form the desired ester modified (meth)acrylic latex.

Suitable alkyl (meth)acrylate monomers (a2), include alkyl (meth)acrylate monomers having in the range of from 1 to 18 carbons in the alkyl portion. This includes linear, branched and cycloalkyl groups. Suitable (meth)acrylate monomers include, for example, methyl (meth)acrylate, ethyl (meth)acrylate, propyl (meth)acrylate, butyl (meth) acrylate, isobutyl (meth)acrylate, pentyl (meth)acrylate, hexyl (meth)acrylate, 2-ethyl hexyl (meth)acrylate, cyclohexyl (meth)acrylate, isobornyl (meth)acrylate or a combination thereof.

A portion (up to about 20 percent) of the alkyl (meth) acrylate monomers (a2) can contain functional groups such as, for example, hydroxy, amino, carboxylic acid, epoxy, silane or siloxane. Suitable alkyl (meth)acrylate monomers containing functional groups include, for example, 2-hydroxyethyl (meth)acrylate, 2-hydroxypropyl (meth)acrylate, 3-hydroxypropyl (meth)acrylate, 4-hydroxybutyl (meth) acrylate, (meth)acrylic acid, itaconic acid, maleic acid, fumaric acid, and crotonic acid, gamma-(meth)acryloxypropyl trimethoxysilane (SILQUEST® A-174 from GE Silicones, Wilton, Conn.), gamma-(meth)acryloxypropyltris(2-methoxyethoxy) silane, N,N-dimethylaminoethyl (meth) acrylate, N-t-butylaminoethyl (meth)acrylate, 2-aminoethyl (meth)acrylate and glycidyl (meth)acrylate. Combinations of any of the above are particularly useful, provided that the functional groups are compatible with each other. For example, acid and epoxy functional groups can react and should, in general, not be used in combination.

The (meth)acrylic latex (A) can also comprise in the range of from 5 to 30 percent by weight of styrene monomer (a3). The term "styrene monomer" as used herein means not only styrene, but also derivative of styrene, such as, for example, alpha-methyl styrene, 4-methyl styrene, 4-tert-butyl styrene and others.

The (meth)acrylic latex (A) may also comprise small amount (less than 10 percent by weight) of (meth)acrylate monomers having more than one ethylenically unsaturated group. Suitable monomers containing more than one ethylenically unsaturated groups include, for example, ethylene glycol di(meth)acrylate, diethyleneglycol di(meth)acrylate, triethyleneglycol di(meth)acrylate, 1,3-propanediol di(meth)acrylate, 1,4-butanediol di(meth)acrylate, 1,6-hexanediol di(meth)acrylate, 2,2-dimethylpropanediol di(meth)acrylate, tripropylene glycol di(meth)acrylate, 1,3-butylene glycol di(meth)acrylate. Urethane di(meth)acrylates can also be used, since they can impart increased flexibility to the cured coating layer and reduced brittleness, when used in the correct proportion with the other ingredients in coating applications. The urethane (meth)acrylate monomers can be produced by any of the methods known to those skilled in the art. Two typical methods are 1) reacting a diisocyanate with a hydroxy-containing (meth)acrylate, such as 2-hydroxyethyl (meth)acrylate; and 2) reacting an isocyanato alkyl (meth)acrylate with a suitable diol.

In one embodiment, the (meth)acrylic latex (A) comprises a latex polymerized from styrene, butyl acrylate, butyl methacrylate and TONE® M-100.

The (meth)acrylic latex can be made by an emulsion polymerization process. In one embodiment, the individual monomers are dispersed into an aqueous medium by one or more surfactants, such as, for example, non-ionic surfactant, cationic surfactant, or a combination thereof, and the polymerization reaction is carried out, generally at elevated temperatures in the range of about 65° C. to about 150° C., in the presence of a polymerization initiator. Examples of usable polymerization initiators for emulsion polymerization include any one of those commonly used for emulsion polymerization, for example, hydrogen peroxide; persulfates such as ammonium persulfate, potassium persulfate and sodium persulfate; organic peroxides such as cumene hydroperoxide, t-butyl hydroperoxide, benzoyl peroxide, t-butyl peroxy-2-ethylhexanoate, t-butyl peroxybenzoate and lauroyl peroxide; azo compounds such as 4,4'-azobis(4-cyanobutanoic acid) and 2,2'-azobis{2-methyl-N-[-(1-hydroxybutyl)]-propylamide}; redox initiators such as combinations of the above peroxides and reducing agents including sodium sulfoxylate, sodium pyrosulfite, sodium hydrogensulfite and sodium hydroxymethyl sulfinate (RONGALIT® from BASF) or a combination thereof. These polymerization initiators can be used singly or in combination of two or more.

Suitable examples of surfactants include, for example, polyethylene oxide-based non-ionic surfactants and cationic surfactants. Surfactants can be used at 1% to 20% by weight, preferably 5% to 15% by weight, based on the amount of total monomers.

Polyethylene oxide-based non-ionic surfactants for use herein includes, for example, condensation products of polyethylene oxide with hexylphenol, octylphenol, nonylphenol, polycyclic phenyl ether, hexadecanol, oleic acid, $C_{12}$ to $C_{18}$ alkylamines, sorbitan monofatty acid or a combination thereof. In one embodiment, the surfactant can be a condensation product of polyethylene oxide with octylphenol. In a second embodiment, the surfactant is a condensation product of polyethylene oxide with nonylphenol. Suitable non-ionic surfactants include TERGITOL® surfactants available from Dow Chemical Company, Midland, Mich.

Cationic surfactants for use herein include, for example, quaternary ammonium salts such as stearyltrimethyl ammonium chloride, distearyldimethyl ammonium chloride, dodecyltrimethyl ammonium acetate, dodecyltrimethyl ammonium chloride, tetradecyltrimethyl ammonium chloride, hexadecyltrimethyl ammonium chloride, octadecyltrimethyl ammonium chloride, dodecylbenzyltrimethyl ammonium chloride, dodecylmethyldi(polyoxyethylene) ammonium chloride, dioctadecyldimethyl ammonium chloride, alkylpyridinium salts or a combination thereof.

Polyurethane Resin

The waterborne primer composition can include 5 to 40 percent by weight based on the total weight of the film-forming binder of a polyurethane resin (B). The polyurethane resin can be a water soluble or water dispersible composition. Suitable examples can be found in U.S. Pat. No. 5,658,617 to Gobel et al.

In one embodiment, the polyurethane resin (B) comprises or consists essentially of the reaction product of a polyol and a polyisocyanate.

In other embodiments, the polyurethane resin (B) comprises or consists essentially of the reaction product of;
(b1) one or more hydroxy functional polyesters;
(b2) one or more polyisocyanates; and
(b3) one or more hydroxy acids.

The acid functional groups of this reaction product can then be neutralized with one or more amine or polyamine functional compounds to form a waterborne polyurethane resin.

In some embodiments, the hydroxy functional polyester (b1) used to form the polyurethane resin (B) can be selected from commercially available hydroxy functional polyesters. In other embodiments, the hydroxy functional polyester (b1) can be derived from the polycondensation reaction of one or more polyols, including diols, triols, higher polyols or a combination thereof with one or more polyacids, including diacids, triacids or higher polyacids. A small portion of monofunctional alcohols, and/or monofunctional carboxylic acids can also be incorporated into the hydroxy functional polyester (b1). Also, if desired, compounds having both hydroxy groups and carboxylic acid groups can be added to form the hydroxy functional polyester (b1).

Suitable polyols include, for example, diols such as alkylene glycols, e.g. ethylene glycol, propylene glycol, butylene glycol, neopentyl glycol or other glycols such as dimethylol cyclohexane. Use can also be made of small quantities of higher-functional polyols or mixtures of higher-functional and monofunctional polyols such as trimethylol propane, pentaerythritol, glycerol, hexanetriol; polyethers which are condensates of glycols with alkylene oxides; or monoethers of the aforementioned glycols, such as diethylene glycol monoethyl ether or tripropylene glycol monomethyl ether.

The carboxylic acid component of the hydroxy functional polyester (b1) can comprise di-, tri- or higher carboxylic acids or anhydrides thereof having 2 to 18 carbon atoms in the molecule.

The following are examples of suitable carboxylic acids: phthalic acid, isophthalic acid, terephthalic acid, tetrahydrophthalic acid, hexahydrophthalic acid, adipic acid, azelaic acid, sebacic acid, fumaric acid, maleic acid, glutaric acid, succinic acid or itaconic acid. These acids can be replaced by their anhydrides, if they exist. Alternatively, branched polyesters can be obtained by adding proportions of trifunctional carboxylic acids such as trimellitic acid, aconitic acid; and anhydrides thereof.

Compounds having both hydroxy groups and carboxylic acid groups that can be used include, for example, malic acid, dimethyol propoionic acid or a combination thereof.

The above polyesters (b1) can be reacted with polyisocyanates (b2). Suitable polyisocyanates (b2) include aliphatic and/or aromatic polyisocyanates having, on average, 2 or more isocyanate groups per molecule. Typical polyisocyanates include, for example, aliphatic polyisocyanates, cycloaliphatic polyisocyanates, aromatic polyisocyanates, and polyisocyanate adducts thereof. Polyisocyanate adducts can contain isocyanurate, allophanate, uretidione and/or biuret groups.

Examples of suitable aliphatic, cycloaliphatic and aromatic polyisocyanates that can be used include the following: 2,4-toluene diisocyanate, 2,6-toluene diisocyanate, 4,4-diphenyl methane diisocyanate, 4,4'-dicyclohexyl methane diisocyanate, 3,3'-dimethyl-4,4'-biphenyl diisocyanate, 1,4-benzene diisocyanate, trans-cyclohexane-1,4-diisocyanate, 1,5-naphthalene diisocyanate, 1,6-hexamethylene diisocyanate (HDI), 4,6-xylene diisocyanate, isophorone diisocyanate,(IPDI), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate; polyisocyanates having isocyanurate structural units; polyisocyanates having uretidione structural units; adducts of 3 molecules of diisocyanates and 1 molecule of water; allophanates, trimers and biurets of hexamethylene diisocyanate, allophanates, trimers and biurets of isophorone diisocyanate and the isocyanurate of hexamethylene diisocyanate.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as TOLONATE® HDT from Rhodia Corporation and the trimer of isophorone diisocyanate are also suitable.

An isocyanate functional adduct can be used, such as, for example, the adduct of a polyisocyanate and a polyol or the adduct of a polyisocyanate and a polyamine. Any of the aforementioned polyisocyanates can be used with a polyol and/or polyamine to form an isocyanate functional adduct.

Melamine

The waterborne primer composition also contains in the range of from 5 to 20 percent, based on the weight of the film-forming binder, of a melamine (C). The melamine can be chosen from any of the known commercially available melamine resins. Melamines that are suitable include, for example, alkylated melamines that are water-soluble or water-dispersible and have a relatively low molecular weight. Alkoxy monomeric melamines that can be used are low molecular weight melamines that contain, on average, three or more methylol groups reacted with monohydric alcohols having 1 to 5 carbon atoms, such as, methanol, propanol, n-butanol and isobutanol.

Suitable melamines include highly alkylated melamines, such as, methylated melamines, methylated and butylated melamines, butylated melamines, isobutylated melamines and combinations thereof. Commercially available alkylated melamines include, for example, hexamethoxymethylol melamines, such as, CYMEL® 301, CYMEL® 303 and RESIMENE® 747. CYMEL® 1156 which is reported to be a 100% butylated melamine having a degree of polymerization of 2.9 is another melamine that can be used. A suitable combination of melamines is CYMEL® 1156 and RESIMENE® CE-4514 which is reported to be a 50/50 methylated/butylated melamine.

These melamines are supplied commercially; for example, by Cytec Industries Inc., West Patterson, N.J. and by Ineos, Marietta, Ga.

In order to enable adequate curing, coating compositions containing melamines (B), can contain from about 0.1 to 2.0%, based on the weight of binder, of a strong acid catalyst, or amine salt thereof. In one embodiment, the catalyst is amino-methyl propanol blocked dodecyl benzyl sulfonic acid, available as NACURE® 5225 from King Industries. Phosphoric acid, and salts thereof, are also effective catalysts.

Polyester Resin

The waterborne primer composition can optionally include up to 25 percent by weight based on the total weight of the film-forming binder of a polyester resin (D). The polyester resin can be a water soluble or water dispersible polyester resin composition.

In one embodiment, the polyester resin comprises or consists essentially of the reaction product of
(d1) 1 to 25 percent by weight of a polyalkylene glycol monoalkyl ether with a number average molecular weight less than 1600;
(d2) 40 to 65 percent by weight of one or more polycarboxylic acids or their anhydrides; and
(d3) 35 to 60 percent by weight of one or more polyhydric alcohols. All percents by weight are based upon the sum of (d1), (d2) and (d3) being equal to 100 percent.

In a second embodiment, the polyester resin is described in U.S. 2005/0255330A1, example 2.

The polyester resin can have an acid number from about 2 to 30 mg KOH/g resin, a hydroxyl number from about 50 to 200 mg KOH/g resin, a number average molecular weight from about 1,000 to 10,000, and can be prepared in a condensation polymerization process followed by the neutralization of the acid groups using ammonium hydroxide, amine, an inorganic base or a combination thereof.

The polyalkylene glycol monoalkyl ether (d1) may be represented by the formula:

$$H-(OX)_n-OR$$

where X is selected from the group consisting of $CH_2CH_2$, $CH_2CH(CH_3)$, $CH_2CH_2CH_2$, or any combination thereof, n is an integer of 7 to 25, and R is an alkyl group of 1 to 4 carbon atoms. One commercially available example of the polyalkylene glycol monoalkylether is CARBOWAX® PEG 500 methoxypolyethylene glycol from Dow Chemical Corporation, Midland, Mich.

Suitable polycarboxylic acids or their anhydrides (d2) can include, for example, aromatic, aliphatic, and cycloaliphatic carboxylic acids, such as 1,4-cyclohexane dicarboxylic acid, 1,3-cyclohexane dicarboxylic acid, hexahydro-4-methylphthalic acid; tetrahydrophthalic acid, phthalic acid, isophthalic acid, terephthalic acid, trimellitic acid, adipic acid, azelaic acid, sebasic acid, succinic acid, maleic acid, glutaric acid, malonic acid, pimelic acid, suberic acid, fumaric acid, itaconic acid or a combination thereof. Anhydrides of the above acids, where they exist, can also be employed and are encompassed by the term "polycarboxylic acids".

Examples of polyhydric alcohols (d3) include, for example, diols, triols and higher alcohols. Specific examples include, for example, trimethylolpropane, trimethylolethane, tris(hydroxyethyl) isocyanurate, glycerine, and pentaerythritol, and dihydric alcohols or diols such as neopentyl glycol, dimethylol hydantoin, ethylene glycol, propylene glycol, 1,4-butylene glycol, diethylene glycol, dipropylene glycol, 1,4-cyclohexane dimethanol, 3-(hydroxypivaloyloxy)-2,2-dimethylpropanol, 1,3-propane diol, 1,6-hexanediol, dimethylol propionic acid, and the like.

The above described polyester resin has a combination of ionic and nonionic stabilization. The ionic stabilization is derived from the neutralization of acid functional groups that are present on the polyester resin to form an acid-base ionic salt. The nonionic stabilization is derived from the polyalkylene glycol monoalkyl ether groups that are present in the polyester resin.

Ionic stabilization is derived from the neutralization of acid groups present in the polyester resin. Ammonium hydroxide, amines, inorganic bases or a combination thereof can be used to neutralize the acid groups. Suitable amines include, for example, ammonium hydroxide, 2-amino-2-methyl-1-propanol, N,N-dimethyl-2-amino-1-propanol, amino methyl propanol, amino ethyl propanol, dimethyl ethanol amine, triethylamine or a combination thereof. Inorganic bases include, for example, sodium hydroxide, potassium hydroxide, magnesium hydroxide, calcium hydroxide or a combination thereof.

The waterborne primer coating compositions can also contain additives that are commonly used in coating compositions. Such additives include, for example, wetting agents; leveling and flow control agents, for example, RESIFLOW® S (polybutylacrylate), BYK® 320 and 325 (high molecular weight polyacrylates), BYK® 347 (polyether-modified siloxane); rheology control agents, such as, for example, LAPONITE® synthetic clay, available from Southern Clay Products, Inc., Gonzales, Tex.; ultraviolet light stabilizers; foam control agents; catalysts or a combination thereof.

In one embodiment, the solvent can be an aqueous solvent to disperse the ingredients of the waterborne primer composition and the total solids content is about 40 to 60 percent by weight. It should be understood, that some of the components of the waterborne primer composition may have solvents other than water. It is desired to minimize the amount of non-aqueous solvents and that more than 50% of the solvent of the primer composition should be water.

The waterborne basecoat composition comprises the same or similar components as the waterborne primer composition. However, to achieve the desired holdout and resistance to intermixing properties, the waterborne basecoat compositions utilizes lower P/B ratio and lower total solids. In one embodiment, the waterborne or water dispersible film forming binder of the waterborne basecoat composition comprises or consists essentially of:

(A) in the range of 20 to 60 by weight of (meth)acrylic latex;

(B) in the range of from 15 to 35 by weight of a polyurethane resin; and (C) in the range of from 5 to 20 by weight of a melamine; and (D) optionally, up to 25 percent by weight of a polyester resin.

In another embodiment, the waterborne or water dispersible film forming binder of the waterborne primer composition comprises;

(A) in the range of from 30 to 50 percent by weight of (meth)acrylic latex;

(B) in the range of from 20 to 30 percent by weight of a polyurethane resin; and (C) in the range of from 8 to 18 percent by weight of a melamine; and (D) optionally, in the range of from 0.1 to 21 percent by weight of polyester resin.

The resins were previously described and will not be repeated here. In producing the waterborne basecoat composition, the P/B ratio and the total solids is formulated at lower levels when compared to the waterborne primer composition. The waterborne basecoat composition comprises pigments in a P/B ratio from about 10/100 to about 25/100. The total solids for the waterborne basecoat composition can be in the range of from 15% to 40%.

Suitable pigments include, for example, titanium dioxide, zinc phosphate, iron oxide, carbon black, amorphous silica, high surface area silica, barium sulfate, talc; chromate pigments for corrosion resistance, such as, calcium chromate, strontium chromate, zinc chromate, magnesium chromate, barium chromate; hollow glass spheres; metal flake pigments; pearlescent pigments; opalescent pigments or a combination thereof. The pigments are typically added to the waterborne basecoat compositions as dispersions of pigments in aqueous solvent such as is known in the art.

The waterborne clearcoat is not particularly limited. Many waterborne clearcoat compositions are known in the art and are commercially available. In one embodiment, the waterborne clearcoat composition is GEN® IV ESW, commercially available from DuPont, Wilmington, Del.

Method for Forming Coated Film

According to the method for forming a multi-layer coated film disclosed herein, a primer coated layer is formed on a substrate using the primer coating composition, then a base coated layer is formed using the base coating material and a clear coated layer is formed using the clear coating material in this order in the wet-on-wet manner. Optionally, a flash-dry step can be performed after the application of each of the primer, basecoat and/or clearcoat compositions.

According to the present disclosure, when the three coating compositions described above are applied to automobile bodies, conventional coating methods such as spraying, electrostatic spraying, high rotational electrostatic bells, and the like, can be conducted. The preferred techniques for applying all three coatings are air atomized spraying with or without electrostatic enhancement, and high speed rotary atomizing electrostatic bells, since these techniques are typically employed in modern automobile and truck assembly plants.

The primer coating material can be applied to form a dry coated layer having a thickness of in the range of from 7 to 60 micrometers, preferably 12 to 36 micrometers, but it may vary according to the intended use. If the thickness is more than the upper limit, image sharpness may deteriorate or a trouble such as unevenness or sagging may occur at the time of application. If it is less than the lower limit, the electro-primed substrate may not be hidden, and film discontinuity may occur, which could expose the electrocoat layer to excess UV transmission and degradation. Optionally, after the application of a layer of the primer composition, a flash-dry step can be performed to remove at least a portion of the aqueous solvent.

The flash-dry steps as described herein can range from a step of allowing the coated substrate to air dry for 3 minutes up to and including at least partially drying the applied coating at temperatures up to 90° C. for a period of up to 20 minutes. The flash dry step can also be assisted by a means for blowing air onto the substrate using, for example, fans or blowers. The conditions represented here should be enough to remove at least a portion of the solvent, but not to begin the curing of the applied coating composition.

On the uncured primer composition layer, one or more layers of the basecoat composition can be applied. The basecoat composition can be applied using air-electrostatic spray coating or a rotary atomizing electrostatic bell so as to have a dry thickness of in the range of from 10 to 30 micrometers. Optionally, after the application of a layer of the basecoat composition, a flash-dry step can be performed to remove at least a portion of the aqueous solvent.

The clearcoat composition can then applied on the basecoat layer, for the purpose of protecting a surface of the basecoat layer. The clearcoat composition can be applied, like the basecoat composition, with using the rotary atomizing electrostatic bells. The layer of clearcoat composition is preferably formed so as to have a dry film thickness in the range of from 25 to 75 micrometers. Optionally, the applied layer of clearcoat composition can be flash-dried to remove at least a portion of the aqueous solvent.

The applied layers obtained as described above can then be cured simultaneously to form a dried and cured multi-layer film. The three layered coated film is then cured in a curing oven at a curing temperature within the range of 100° C. to 180° C., preferably 130° C. to 160° C., so as to obtain a cured coated film with high crosslinking density. The curing time may vary depending on the curing temperature, however, a curing time of 10 to 30 minutes can be adequate when the curing temperature is 130° C. to 160° C. This method does not require an oven for curing the primer and for drying the basecoat compositions prior to the application of the clearcoat composition, and is favorable from the economical and the environmental viewpoint.

According to the process of the present invention, the multi-layered coated film is formed so as to have a thickness of 42 to 165 micrometers. It is important to have an adequate film build in each of the layers of the present invention, as a low film build will affect the appearance, mechanical properties, and the amount of UV transmittance to the underlying layers. Too low a film build can allow UV radiation to penetrate to the electrocoated layer. Most electrocoat layers are not formulated with UV absorbers and they tend to be very susceptible to UV degradation.

Also disclosed is a substrate having applied thereon a dried and cured multi-layer coating according to the described method. Suitable substrates include, for example, automobile bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, boats, aircraft, coil coating; railroad cars; printed circuit boards; machinery; OEM tools; signage; fiberglass structures; sporting goods; and sporting equipment.

In one embodiment, is disclosed a substrate comprising a dried and cured multilayer coating composition wherein the multilayer film is applied using a method comprising the steps of;

(1) applying a layer of a waterborne primer composition;
(2) applying a layer of a waterborne basecoat composition;
(3) applying a layer of a waterborne clearcoat composition; and
(4) curing the applied layers of waterborne primer, basecoat and clearcoat compositions;

wherein the applied layers of waterborne primer, basecoat and clearcoat compositions are applied wet-on-wet without a curing step in between the application of each layer; and wherein the waterborne primer composition comprises or consists essentially of (a) a waterborne or water dispersible film forming binder; and
(b) pigments; and wherein the film forming binder comprises or consists essentially of;

(A) 20% to 60% by weight of a (meth)acrylic latex;
(B) 5% to 40% by weight of a polyurethane dispersion;
(C) 5% to 20% by weight of a melamine; and
(D) optionally, up to 25% by weight of a polyester; and wherein the ratio of (a) to (b) in the waterborne primer composition is in the range of from 80/100 to 150/100.

EXAMPLES

Unless otherwise stated, all ingredients are available from the Aldrich Chemical Company, Milwaukee, Wis.

AMP®-95 amino alcohol, BUTYL CELLOSOLVE® solvent and TONE® M-100 acrylate monomers are available from Dow Chemical, Midland, Mich.

NACURE® catalysts and K-FLEX® additives are available from King Industries, Norwalk, Conn.

SURFYNOL® surfactants are available from Air Products, Inc., Allentown, Pa.

Ti-PURE® R-960 titanium dioxide, CORMAX® VI electrocoat, and GEN® IV ESW clearcoats are available from E.I. DuPont, Wilmington, Del.

RAVEN® 5000 Ultra II Powder pigment is available from Columbian Chemicals Company, Marietta, Ga.

LAPONITE® layered silicate is available from Southern Clay Products, Gonzales, Tex.

CYMEL® melamine resins are available from Cytec Industries, Inc., West Paterson, N.J.

TINUVIN® light stabilizers and VISCALEX® rheology modifiers are available from Ciba, Basel, Switzerland.

FOAMSTAR® defoamers are available from Cognis, Monheim, Germany.

ISOPAR® solvents are available from ExxonMobil, Houston, Tex.

KROMA® RED RO-3097 pigment is available from Rockwood Pigments NA, INC., Beltsville, Md.

BAYFERROX® pigments are available from Lanxess Corporation, Pittsburgh, Pa.

TEGO® wetting additives are available from Evonik Tego Chemie GmbH, Essen, Germany.

ARCOL® polyols are available from Bayer MaterialScience, Pittsburgh, Pa.

HYDREAU® polymers are available from Eastman Chemicals, Kingsport, Tenn.

SPARKLE SILVER® PREMIER is available from Silberline Manufacturing Co., Tamaqua, Pa.

LUBRIZOL® phosphate ester is available from Lubrizol, Wicliffe, Ohio.

The following (meth)acrylic latexes modified with TONE® M-100 were prepared, and then used to formulate three wet waterborne primer coating compositions. All amounts in Table 1 are given in parts by weight.

Preparation of (meth)acrylic Latexes 1 to 4

TABLE 1

| | (Meth)acrylic latex | | | |
|---|---|---|---|---|
| Ingredient | 1 | 2 | 3 | 4 |
| Portion 1 | | | | |
| Water | 600 | 600 | 600 | 600 |
| Portion 2 | | | | |
| Water | 1000 | 10000 | 1000 | 1000 |
| AMP ®-95 | 8 | 8 | 8 | 8 |
| Styrene | 155.93 | 155.93 | 155.93 | 155.93 |
| Diurethane Dimethacrylate | 103.95 | | | |
| Butyl acrylate | 155.93 | 259.88 | | |
| Butyl methacrylate | 103.95 | 103.95 | 363.8 | |
| Methyl methacrylate | | | | 363.83 |
| TONE ® M-100 | 519.75 | 519.75 | 519.75 | 519.75 |
| NACURE ® XP-221 | 23.31 | 23.31 | 23.31 | 23.31 |
| Portion 3 | | | | |
| Water | 269.5 | 200 | 200 | 200 |
| Ammonium Persulfate | 3.09 | 3.09 | 3.09 | 3.09 |

Portion 1 was added to a 5 liter reactor and heated to 85° C. Portion 2 was added to a feed tank and was emulsified with an Eppenbach mixer. A small portion (about 5 percent) of the emulsified Portion 2 was added to the reactor and the heat was maintained at 80° C. Portion 3 was added to a dropping funnel and stirred to dissolve the ammonium persulfate. When reactor temperature was 80° C., one-half of Portion 3 was added to the reaction as a shot and the batch was allowed to exotherm to 83-86° C. When the temperature stabilized at 83-86° C., the remainder of portions 2 and 3 were added over a 120 minute period. The temperature was maintained at 83-86° C. during the addition of the remaining portions 2 and 3. The temperature of the reaction was held for 60 minutes at 83-86° C. after additions were completed. The reaction mixture was cooled and filtered through a 100 micron bag.

The (meth)acrylic latexes prepared above had the compositions and properties shown in Table 2. Particle size was measured by a NANOTRAC® particle size analyzer, available from Microtrac, Inc., Montgomeryville, Pa.

TABLE 2

| | (Meth)acrylic latex | | | |
|---|---|---|---|---|
| | 1 | 2 | 3 | 4 |
| Styrene | 15% | 15% | 15% | 15% |
| Diurethane dimethacrylate | 10% | | | |
| Butyl acrylate | 15% | 25% | | |
| Butyl methacrylate | 10% | 10% | 35% | |
| Methyl methacrylate | | | | 35% |
| TONE ® M-100 | 50% | 50% | 50% | 50% |
| Hydroxy value | 80 | 80 | 80 | 80 |
| pH | 4.50 | 4.60 | 4.61 | 4.56 |

TABLE 2-continued

|  | (Meth)acrylic latex | | | |
| --- | --- | --- | --- | --- |
|  | 1 | 2 | 3 | 4 |
| Solids | 35.86% | 36.88% | 35.37% | 34.50% |
| $T_g$ (° C.) | −27.2 | −33.3 | −22.8 | −16.1 |
| Particle Size (nm) | 81 | 107 | 89 | 113 |

Preparation of Comparative (meth)acrylic Latexes

Comparative acrylic Latex 1, 2 and 3 were prepared according to Example 1 of US 2005/0255330 using the monomer percentages shown in Table 3.

TABLE 3

|  | Comparative Acrylic Latex | | |
| --- | --- | --- | --- |
|  | 1 | 2 | 3 |
| Allyl methacrylate | 2.3% | 2.3% | 0.5% |
| Methyl methacrylate | 13.1% | 35.6% | 41.2% |
| Butyl acrylate | 76.9% | 58.2% | 55.3% |
| 2-Hydroxyethyl acrylate | 4.5% | 2.3% |  |
| 2-Hydroxyethyl methacrylate |  |  | 1.5% |
| Methacrylic acid | 3.2% | 1.6% |  |
| Acrylic acid |  |  | 1.6% |
| Hydroxy value | 22 | 11 |  |
| Acid value | 20.4 | 10.2 | 12.5 |
| Solids | 30.3% | 35.1% | 46.0% |
| $T_g$ (° C.) | −22.39 | −19.94 | −9.86 |
| Particle Size (nm) | 198 | 115 | 146 |

Preparation of Polyester A

A polyester was prepared by reacting 512.95 grams of 1,6-hexane diol, 342.105 grams of adipic acid and 180.37 grams of isophthalic acid at a maximum temperature of 250° C. Water was collected from the reaction mixture until an acid number of 3 was reached. The polyester was cooled and used as is.

Preparation of Polyurethane Dispersion

TABLE 4

| Ingredient | Amount (grams) |
| --- | --- |
| Portion 1 | |
| Dimethylol propionic acid | 12.08 |
| Polyester A | 220.72 |
| N-methyl-2-pyrrolidone | 92.1 |
| Portion 2 | |
| Isophorone diisocyanate | 82.98 |
| N-methyl-2-pyrrolidone | 13.04 |
| Portion 3 | |
| 20% dimethyl isopropanolamine in water | 41.93 |
| Water | 342.37 |
| Portion 4 | |
| Water | 55.4 |
| Ethylene diamine | 3.69 |
| Portion 5 | |
| Water | 59.90 |

The ingredients of Table 4, portion 1 were added to a reactor and were heated to 65° C. to dissolve the dimethylol propionic acid. Dissolution was complete after about 3.5 hours. The ingredients of portion 2 were added to the reactor over a 10 minute period and the reaction was allowed to exotherm to 75° C. After the addition was complete, the reaction mixture was stirred for 4 hours at 75° C. The mixture was then cooled to 35° C. and the ingredients of portion 4 were added all at once and mixed for 5 minutes. The ingredients of portion 5 were added and the polyurethane dispersion was used as is. The solids content of the polyurethane dispersion is determined to be 35.5%.

Preparation of Polyester B

TABLE 5

| Ingredient | Amount (grams) |
| --- | --- |
| Portion 1 | |
| Neopentyl glycol | 268.98 |
| Adipic acid | 283.1 |
| Methoxy polyethylene glycol | 67.47 |
| Trimethylol propane | 86.62 |
| Phthalic anhydride | 66.88 |
| Isophthalic acid | 67.04 |
| Portion 2 | |
| Dipropylene glycol methyl ether | 84.71 |
| Portion 3 | |
| N-butyl alcohol | 84.71 |

The ingredients of Table 5, portion 1 were added to a reactor and heated to 230-240° C. The temperature was held at 235° C., and water was distilled. As soon as the acid number reached between 6 and 7, the batch was cooled to 160° C., and portion 2 was added to the reactor. The reaction was cooled batch to 100° C., then portion 3 was added to the reactor. The batch was cooled to room temperature, and the percent solids was determined to be 80%.

Preparation of White Dispersion

TABLE 6

| Ingredient | Amount (grams) |
| --- | --- |
| Portion 1 | |
| Deionized water | 25.3 |
| Comparative Acrylic Latex 2 | 3.0 |
| AMP ®-95 | 0.2 |
| Example 6 of U.S. Pat. No. 5,231,131 | 2.5 |
| SURFYNOL ® 104DPM | 1.0 |
| Portion 2 | |
| TI-PURE ® R-960 | 68.0 |

Portion 1 of Table 6 was charged with mixing to a premix container and mixed for 15 minutes. Portion 2 was slowly added with mixing and then mixed for 1 hour. The resulting mixture was ground in a schold mill. The white dispersion had a pigment to binder (P/B) ratio of 3786/100 and a solids content of 69.8%

Preparation of Black Dispersion

TABLE 7

| Ingredient | Amount (grams) |
| --- | --- |
| Portion 1 | |
| Example 1 of U.S. Pat. No. 6,204,319 | 10.0 |
| SURFYNOL ® 104BC | 0.3 |
| AMP ®-95 | 1.8 |
| Deionized water | 32.9 |

TABLE 7-continued

| Ingredient | Amount (grams) |
|---|---|
| Portion 2 | |
| RAVEN ® 5000 Ultra II Powder | 10.0 |
| Deionized water | 35.0 |

Portion 1 of Table 7 was charged with mixing to a premix container and mixed for 15 minutes. Portion 2 was slowly added with mixing and then mixed for 1 hour. The resulting mixture was ground in a schold mill. The white dispersion had a pigment to binder (P/B) ratio of 168/100 and a solids content of 14.37%

Preparation of Silica Dispersion

TABLE 8

| Ingredient | Amount (grams) |
|---|---|
| Portion 1 | |
| Deionized water | 77.64 |
| N-methyl diethanol amine | 1.9 |
| Comparative Acrylic Latex 2 | 2.46 |
| Portion 2 | |
| SYLOID ® 378 | 18.0 |

Portion 1 of table 8 was added in order with mixing to a premix tank and mixed for 15 minutes. Portion 2 was then added slowly with mixing until Hegman no. 7-8 was achieved. The silica dispersion had a P/B ratio of 2083/100 and a solids content of 18.86%

Preparation of Red Iron Oxide Dispersion

TABLE 9

| Ingredient | Amount (grams) |
|---|---|
| Portion 1 | |
| Comparative Acrylic Latex 2 | 5.7 |
| N-methyl diethanol amine | 0.24 |
| Example 6 of U.S. Pat. No. 5,231,131 | 17.28 |
| SURFYNOL ® 104DPM | 0.30 |
| Deionized water | 11.55 |
| Portion 2 | |
| KROMA ® RED RO-3097 | 64.93 |

Portion 1 of table 9 was added in order with mixing to a premix tank and was mixed for 15 minutes. Portion 2 was slowly added with mixing. When the addition was complete, the mixture was stirred 30 minutes. The paste was ground on LMZ grinding equipment until a Hegman number 7-8 was achieved. The red iron oxide dispersion had a P/B ratio of 910/100 and a solids content of 72.1%.

Preparation of Yellow Iron Oxide Dispersion

TABLE 10

| Ingredient | Amount (grams) |
|---|---|
| Portion 1 | |
| Example 6 of U.S. Pat. No. 5,231,131 | 22.67 |
| SYRFYNOL ® 104DPM | 0.400 |
| AMP ®-95 | 0.30 |
| Deionized water | 34.13 |

TABLE 10-continued

| Ingredient | Amount (grams) |
|---|---|
| Portion 2 | |
| BAYFERROX ® 392 | 42.5 |

Portion 1 of table 10 was added in order with mixing to a premix tank and was mixed for 15 minutes. Portion 2 was slowly with mixing. When the addition was complete, it was then stirred for 30 minutes. The paste was ground on LMZ grinding equipment until a Hegman number of 7-8 was achieved. The Yellow iron oxide dispersion had P/B ratio of 631/100 and a solids content of 49.2%.

Preparation of Waterborne Primer Coating Compositions 1 to 4

TABLE 11

| | Primer Composition | | | |
|---|---|---|---|---|
| | 1 | 2 | 3 | 4 |
| Portion 1 | | | | |
| (meth)acrylic latex 1 | 1026.68 | | | |
| (meth)acrylic latex 2 | | 1005.01 | | |
| (meth)acrylic latex 3 | | | 879.12 | |
| (meth)acrylic latex 4 | | | | 872.9 |
| LAPONITE ® | 206.98 | 207.59 | 597.31 | 593.3 |
| Portion 2 | | | | |
| Polyurethane Dispersion | 731.83 | 733.77 | 641.86 | 637.3 |
| CYMEL ® 301 | 100.9 | 101.16 | 88.5 | 87.9 |
| TINUVIN ® 384-2 | 8.05 | 8.05 | 8.05 | 8.05 |
| NACURE ® XP-221/AMP-95 | 8.51 | 8.51 | 8.51 | 8.51 |
| FOAMSTAR ® I-300 | 15.26 | 15.26 | 15.26 | 15.26 |
| AMP ®-95 | 2.91 | 2.91 | 2.91 | 2.91 |
| Portion 3 | | | | |
| Polyester B | 182.60 | 183.09 | 160.15 | 159.03 |
| Portion 4 | | | | |
| White Dispersion | 1088.97 | 1091.72 | 953.80 | 947.33 |
| Black Dispersion | 113.91 | 114.23 | 100.38 | 99.71 |
| VISCALEX ® HV 30 | 19.94 | 19.97 | 10.00 | 10.00 |
| Pigment to binder ratio | 80.6/100 | 80.6/100 | 80.6/100 | 80.6/100 |
| % Solids | 48.43 | 48.56 | 43.60 | 43.60 |

All amounts in Table 11 are in grams.

The ingredients of Table 11, portion 1 were added to a suitable mixing vessel with stirring. The mixture was then stirred for 60 minutes. The ingredients of portion 2 were added, in order, to the mixture. When all of the ingredients of portion 2 had been added, the mixture was stirred for 30 minutes. Portion 3 was then added followed by 15 minutes of stirring. The ingredients of portion 4 were added, in order. This mixture was then stirred for 15 minutes.

The above primer coating compositions contain the following percentages of each film forming binder;

1. (Meth)acrylic latex=42.1%
2. Polyurethane=29.7%
3. Melamine=11.5%
4. Polyester=16.7%

Preparation of Comparative Slurry Primer

TABLE 12

| Ingredient | Amount (grams) |
|---|---|
| Portion 1 | |
| Comparative Acrylic Latex 2 | 414.19 |
| LAPONITE ® | 159.92 |
| Silica dispersion | 97.27 |
| Portion 2 | |
| Red iron oxide dispersion | 5.01 |
| Black dispersion | 26.50 |
| Yellow iron oxide dispersion | 46.13 |
| White Dispersion | 436.94 |
| ISOPAR ® H solvent | 7.0 |
| Portion 3 | |
| TEGO ® Wet 280 | 14.95 |
| CYMEL ® 301 | 337.47 |
| K-FLEX ® UD-350W | 127.19 |
| Polyester B | 30.14 |
| ARCOL ® Polyol ppg-425 | 114.77 |
| HYDREAU ® 290-4253 | 1590.75 |
| NACURE ® XC-A246 | 47.99 |
| Portion 4 | |
| Methyldiethanol amine | 9.1 |
| Water | 34.68 |
| TOTAL | 3500 |

The ingredients of table 12, portion 1 were added to a suitable mixing vessel with stirring. The mixture was stirred for 60 minutes. The ingredients of portion 2 were added, in order, to the mixture. When all of the ingredients of portion 2 had been added, the mixture was stirred for 15 minutes. Portion 3 was then added followed by 15 minutes of stirring. The ingredients of portion 4 were added, in order. This mixture was then stirred for 15 minutes. The above slurry primer coating composition was formulated at 23/100 pigment to binder, and had a solid content of 52.5%.

The comparative slurry primer comprises:
1. Primer resin=10.1%
2. Polyurethane=8.5%
3. Melamine=25.4%
4. Polyester=56.0%

Preparation of Aluminum Dispersion

TABLE 13

| Ingredient | Amount (grams) |
|---|---|
| Portion 1 | |
| N-butoxy propanol | 22.9 |
| N-methyl-2-pyrrolidone | 2.67 |
| Portion 2 | |
| SPARKLE SILVER ® PREMIER 552 | 14.86 |
| Portion 3 | |
| N-butoxy propanol | 1.10 |
| Portion 4 | |
| LUBRIZOL ® 2062D | 3.37 |
| Portion 5 | |
| Comparative Acrylic latex 1/AMP ®-95/water (67.7%/6.8%/25.5%) | 6.62 |
| Portion 6 | |
| Comparative Acrylic latex 1/water (72.7%/27.3%) | 41.99 |
| water | 6.50 |

Portion 1 of table 13 was added to a premix tank and then portion 2 was added slowly with mixing and then mixed for 30 minutes. Portions 3, 4, 5 & 6, were added in order and, when the additions were complete, mixed for 30 minutes.

Preparation of Waterborne Silver Basecoat Compositions 1 and 2

TABLE 14

| Ingredient | Basecoat 1 | Basecoat 2 |
|---|---|---|
| Portion 1 | | |
| Comparative Acrylic Latex 2 | 538.56 | |
| Comparative Acrylic Latex 3 | | 410.57 |
| LAPONITE ® | 746.44 | 746.44 |
| Portion 2 | | |
| Water | 420 | 420 |
| Polyurethane dispersion | 363.42 | 363.71 |
| CYMEL ® 301 | 74.09 | 74.18 |
| 2-Ethyl hexanol | 38.68 | 38.68 |
| TINUVIN ® 384-2 | 8.23 | 8.23 |
| FOAMSTAR ® I-300 | 17.01 | 17.01 |
| AMP ®-95 | 1.44 | 1.44 |
| NACURE ® XP221/AMP ®-95 | 7.84 | 7.84 |
| Portion 3 | | |
| Polyester B | 125.57 | 125.57 |
| Portion 4 | | |
| Aluminum dispersion | 1013.05 | 1013.05 |
| Water | 145.67 | 273.25 |
| Pigment to binder | 18.6/100 | 18.6/100 |
| % solids | 23% | 23% |

The ingredients of portion 1 were added to a suitable mixing vessel with stirring. The mixture was stirred for 60 minutes. The ingredients of portion 2 were added, in order, to the mixture. When all of the ingredients of portion 2 had been added, the mixture was stirred for 15 minutes. Portion 3 was then added followed by 15 minutes of stirring. The ingredients of portion 4 were added, in order. This mixture was then stirred for 15 minutes.

Waterborne silver basecoat compositions 1 and 2 contain the following percentages of each film forming binder;
1. (Meth)acrylic latex=38.4%
2. Polyurethane=26.2%
3. Melamine=15.0%
4. Polyester=20.4%

Preparation of Comparative Waterborne Silver Basecoat Composition

TABLE 15

| Ingredient | Amount (grams) |
|---|---|
| Portion 1 | |
| Comparative Acrylic Latex 1 | 130.91 |
| Comparative Acrylic Latex 2 | 299.09 |
| LAPONITE ® | 918.38 |
| Portion 2 | |
| Water | 80.51 |
| Polyurethane Dispersion | 86.02 |
| Water | 241.52 |
| ISOPAR ® H solvent | 124.49 |
| NACURE ® XP-221 | 6.41 |
| Water | 80.51 |
| TINUVIN ® 384-2 | 6.42 |

TABLE 15-continued

| Ingredient | Amount (grams) |
|---|---|
| CYMEL ® 301 | 122.50 |
| Foamstar I-300 | 15.56 |
| AMP ®-95 | 1.6 |
| Water | 80.51 |
| Portion 3 | |
| Polyester B | 190.83 |
| BUTYL CELLOSOLVE ® | 29.57 |
| Water | 80.51 |
| Portion 4 | |
| Aluminum Dispersion | 763.14 |
| Water | 241.52 |

The ingredients of portion 1 were added to a suitable mixing vessel with stirring. The mixture was stirred for 60 minutes. The ingredients of portion 2 were added, in order, to the mixture. When all of the ingredients of portion 2 had been added, the mixture was stirred for 15 minutes. Portion 3 was then added followed by 15 minutes of stirring. The ingredients of portion 4 were added, in order. This mixture was then stirred for 15 minutes. The comparative waterborne silver basecoat had a P/B ratio of 17.4/100 and a solids content of 20.3%.

The comparative waterborne silver basecoat composition contains the following percentages of each film forming binder;
1. Comparative Acrylic latex=32.1%
2. Polyurethane=6.8%
3. Melamine=27.2%
4. Polyester=33.9%

3-Wet Application Method

To test the compatibility of the primers and basecoat compositions to a wet-on-wet-on-wet (3-wet) application method, the following procedures were used.

All compositions were sprayed onto steel panels that had previously been coated with a layer of CORMAX® VI electrocoat composition. The electrocoat was applied and then dried and cured according to the manufacturers instructions. The primer compositions were spray applied onto the electrocoated panels so as to provide a dry film thickness in the range of 20 micrometers to 30.5 micrometers. The primer compositions were then baked at elevated temperatures to dry and cure the applied layer or were flashed at room temperature or elevated temperatures for a given amount of time according to the individual examples. The waterborne basecoat compositions were spray applied to the cured or flashed primer compositions so as to obtain a basecoat dry film thickness in the range of from 13 micrometers to 18 micrometers. The layer of applied basecoats were then flashed at room temperature or elevated temperatures for a given amount of time according to the individual examples. A layer of GEN® IV ESW clearcoat was then spray applied to the layer of basecoat composition so as to obtain a clearcoat dry film thickness in the range of from 46 micrometers to 56 micrometers. The applied layer of clearcoat composition was flashed at room temperature for 10 minutes and then the coated panel was placed in an oven at 140° C. for 30 minutes to dry and cure the applied layers.

The compatibility of comparative slurry primer was tested with comparative waterborne silver basecoat for 3-wet process using various primer flash times and temperatures. Prior to application of a layer of GEN® IV ESW clearcoat, the basecoat was flashed for 3, 5 or 10 minutes at 82.2° C. (180° F.). One example of the comparative slurry primer was baked prior to applying wet basecoat/clear coat. The results of this comparative test are presented in table 16.

TABLE 16

(Comparative)

| Comparative slurry primer | Primer Flash time @ Room Temp | 82.2° C. | Visual Appearance |
|---|---|---|---|
| baked | — | — | No defects |
| wet | 5 minutes | — | Total Sliding |
| wet | — | 3 minutes | Severe wrinkling |
| wet | — | 5 minutes | Mudcracking |
| wet | — | 10 minutes | Slight mudcracking |

The results of this comparative test show that a comparative waterborne silver basecoat sprayed over:
i. Baked slurry primer exhibited no film defects as expected.
ii. Wet slurry primer with a 5 minute flash-off at room temperature slid-off completely.
iii. Wet slurry primer with a 3, 5 or 10 minutes flash at 82.2° C. exhibited severe wrinkling to slight mudcrack appearance.

Primer coating composition 2 was tested using a 3-wet method in which the primer, basecoat and clearcoat were applied and flashed, by holding them for a short period of time at temperatures too low to induce curing.

The following examples illustrate the effect of various flash times between multiple layers on appearance.

TABLE 17

| Primer Composition | Panel Orientation | Primer flash at Room Temperature | Basecoat flash at 82.2° C. | Appearance |
|---|---|---|---|---|
| Comparative Slurry primer (baked) | Horizontal Vertical | — | 3 minutes | Acceptable wrinkling |
| Primer composition 2 | Horizontal Vertical | 3 minutes | 3 minutes | wrinkling |
| Primer composition 2 | Horizontal Vertical | 3 minutes | 5 minutes | wrinkling |
| Primer composition 2 | Horizontal Vertical | 3 minutes | 7 minutes | very slight wrinkling |
| Primer composition 2 | Horizontal Vertical | 3 minutes | 10 minutes | Acceptable |

In Table 17, the basecoat used was waterborne silver basecoat 2. The appearance of each applied basecoat prior to the application of the clearcoat was acceptable. Following the application of a layer of the clearcoat composition, the applied layers were flashed at room temperature for 10 minutes and then baked for 30 minutes at 140° C. The appearance of each panel was visually rated after the panels were baked and the appearance is noted in Table 17.

The effect of primer heated flash-off time in 3-wet-on-wet application on final film appearance is presented in table 18.

TABLE 18

| Primer Composition | Panel Orientation | Primer flash at 82.2° C. | Basecoat flash at 82.2° C. | Appearance |
|---|---|---|---|---|
| Comparative slurry primer (baked) | Horizontal Vertical | — | 3 minutes | Acceptable |

TABLE 18-continued

| Primer Composition | Panel Orientation | Primer flash at 82.2° C. | Basecoat flash at 82.2° C. | Appearance |
|---|---|---|---|---|
| Primer composition 2 | Horizontal Vertical | 1 minute | 3 minutes | Slight wrinkling |
| Primer composition 2 | Horizontal Vertical | 3 minutes | 3 minutes | Acceptable |
| Primer composition 2 | Horizontal Vertical | 5 minutes | 3 minutes | Acceptable |
| Primer composition 2 | Horizontal Vertical | 7 minutes | 3 minutes | Acceptable |

Based on the results generated of table 18, a heated primer flash-off time of between 1 or more minutes can be effective to produce acceptable appearance.

A series of panels was produced using the process parameters of Primer flash-off time at 82.2° C. for 3 minutes; basecoat flash-off time at 82.2° C. for 3 minutes; and clearcoat flash-off time at 82.2° C. for 10 minutes; followed by baking the panels in an oven at 140° C. for 30 minutes. The panels were then evaluated for various appearance measurements, including Combined Ford Number; orange peel; distinctness of image (DOI); 15°, 45°, and 110° gloss; and flop according to known procedures. The resistance to chipping of the applied layer as well as repair adhesion was tested. The procedures for determining these measurements are well-known in the art. The results of the tests are given in tables 19, 20 and 21.

TABLE 19

| Primer | Basecoat | Panel Orientation | Combined Ford number | Orange Peel | DOI |
|---|---|---|---|---|---|
| Comparative slurry primer (baked) | Waterborne silver basecoat 2 | Horizontal Vertical | 48.3 48.3 | 49.4 47.8 | 82.3 82.8 |
| Primer 1 | Waterborne silver basecoat 2 | Horizontal Vertical | 42.5 41.7 | 44.1 41.1 | 75.7 77.4 |
| Primer 2 | Waterborne silver basecoat 2 | Horizontal Vertical | 42.7 38.6 | 43.6 40.2 | 77.9 77.6 |

TABLE 20

| Primer | Basecoat | Panel Orientation | 15° gloss | 45° gloss | 110° gloss | Flop |
|---|---|---|---|---|---|---|
| Comparative slurry primer (baked) | Waterborne silver basecoat 2 | Horizontal Vertical | 131.7 131.7 | 65.4 65.2 | 36.7 36.7 | 11.58 11.61 |
| Primer 1 | Waterborne silver basecoat 2 | Horizontal Vertical | 130.3 132.8 | 61.7 60.7 | 34.4 33.7 | 12.31 12.92 |
| Primer 2 | Waterborne silver basecoat 2 | Horizontal Vertical | 133.9 135.9 | 61.7 61.3 | 34.1 33.9 | 12.86 13.24 |

TABLE 21

| Primer | Basecoat | Chip Size | Repair Chip Size |
|---|---|---|---|
| Comparative Example 4 (baked) | Waterborne silver basecoat 2 | 3.0 | 3.2 |
| Primer 1 | Waterborne silver basecoat 2 | 2.7 | 3.2 |
| Primer 2 | Waterborne silver basecoat 2 | 3.3 | 3.3 |

The results of these tests show that the disclosed waterborne compositions can be used in 3-wet application method to produce dried and cured coatings having appearance characteristics that are comparable to coating compositions produced using a traditional baked primer composition.

What is claimed is:

1. A method of forming a multi-layer coating on a substrate, said method comprising the steps of:
   (1) applying to the substrate a layer of a waterborne primer composition;
   (2) applying a layer of a waterborne basecoating composition over and in contact with the waterborne primer composition, such that the waterborne primer composition is disposed throughout a portion of the multilayer coating that extends from the substrate to the layer of the waterborne basecoating;
   (3) applying a layer of a waterborne clearcoat composition over and in contact with the waterborne basecoating composition; and
   (4) curing the applied three layers by baking, with the proviso that no curing steps are performed on either of the applied layer of the waterborne primer composition or the applied layer of the waterborne basecoating composition until step (4);
   wherein said waterborne primer composition comprises: (a1) a first waterborne or water dispersible film forming binder; (b1) first pigments: and (c1) a waterborne solvent that is greater than 50 percent by weight of water;
   wherein said (a1) first waterborne or water dispersible film forming binder consists of:
   (A1) 30 percent to 50 percent by weight of a (meth) acrylic latex, wherein the (meth)acrylic latex is the polymeric reaction product of a monomer mixture consisting of:
     (A.1) 35 percent to 55 percent by weight of an ester modified (meth)acrylic monomer;
     (A.2) 30 percent to 40 percent by weight of an alkyl (meth)acrylate monomer: and
     (A.3) 12 percent to 20 percent by weight of a styrene monomer:
   (B1) 25 percent to 30 percent by weight of a polyurethane resin, wherein the polyurethane resin is the reaction product of a mixture consisting of:
     (B.1) one or more hydroxy functional polyesters:
     (B.2) one or more polyisocyanates; and
     (B.3) one or more hydroxy acids:
   (C1) 8 percent to 14 percent by weight of a melamine, wherein the melamine consists of a water-soluble or water-dispersible, alkylated melamine; and
   (D1) 10 percent to 18 percent by weight of a polyester resin, wherein the polyester resin is the reaction product of a mixture consisting of:
     (D.1) 1 percent to 25 percent by weight of a polyalkylene glycol monoalkyl ether with a number average molecular weight of less than 1600;
     (D.2) 40 percent to 65 percent by weight of one or more polycarboxylic acids or their anhydrides; and
     (D.3) 35 percent to 60 percent by weight of one or more polyhydric alcohols; and
   wherein the (b1) first pigment to (a1) first film forming binder ratio (p/b1) of said waterborne primer composition is in the range of from 80/100 to 100/100: and wherein a total solids content (ts1) of the waterborne primer composition is from 40 percent to 60 percent by total weight of the waterborne primer composition;

wherein said waterborne basecoating composition comprises: (a2) a second waterborne or water dispersible film forming binder; and (b2) second pigments;

wherein said (a2) second waterborne or water dispersible film forming binder consists of:
(A2) 30 percent to 50 percent by weight of the (meth)acrylic latex;
(B2) 25 percent to 30 percent by weight of the polyurethane resin;
(C2) 8 percent to 18 percent by weight of the melamine; and
(D2) 0.1 percent to 21 percent by weight of the polyester resin;
and wherein the (b2) second pigment to (a2) second film forming binder ratio (p/b2) of said waterborne basecoating composition is in the range of from 10/100 to 25/100; and wherein a total solids content (ts2) of the waterborne basecoating composition is from 15 percent to 40 percent, with the proviso that ratio (p/b2) is lower than ratio (p/b1) and that total solids content (ts2) is lower than total solids content (ts1).

2. The method of claim 1, further comprising a flash drying step performed between step (1) and step (2), and between step (2) and step (3), wherein said flash drying removes some, but not all, of waterborne solvent in the applied layer of the waterborne primer composition and the applied layer of the waterborne basecoating composition, but does not initiate curing of the waterborne primer composition or waterborne basecoating composition.

3. The method of claim 2, wherein the substrate is a metal substrate that has previously been primed with a phosphate composition or an electrodeposited composition.

* * * * *